United States Patent
Arbuckle et al.

(10) Patent No.: US 12,312,104 B1
(45) Date of Patent: May 27, 2025

(54) EXPLORATION VEHICLE STOWAGE AND DEPLOYMENT SYSTEMS

(71) Applicant: ASTROBOTIC TECHNOLOGY, INC., Pittsburgh, PA (US)

(72) Inventors: Troy Arbuckle, Farmington, UT (US); Cedric Corpa De La Fuente, Pittsburgh, PA (US); Kerry Quinn, Pittsburgh, PA (US); Mike Provenzano, Jamaica, NY (US); Andrea Davis, Pittsburgh, PA (US)

(73) Assignee: Astrobotic Technology, Pittsburgh, PA (US)

( * ) Notice: Subject to any disclaimer, the term of this patent is extended or adjusted under 35 U.S.C. 154(b) by 0 days.

(21) Appl. No.: 18/376,802

(22) Filed: Oct. 4, 2023

Related U.S. Application Data (60) Provisional application No. 63/413,288, filed on Oct. 5, 2022.

(51) Int. Cl.
 *B64G 1/64* (2006.01)
 *B64G 1/16* (2006.01)
 *B64G 1/22* (2006.01)

(52) U.S. Cl.
 CPC .............. *B64G 1/648* (2013.01); *B64G 1/16* (2013.01); *B64G 1/2228* (2023.08)

(58) Field of Classification Search
 CPC ......... B64G 1/648; B64G 1/2228; B64G 1/16
 See application file for complete search history.

(56) References Cited

U.S. PATENT DOCUMENTS

| | | | |
|---|---|---|---|
| 2012/0080562 A1* | 4/2012 | Auger | B64G 1/625 244/171.7 |
| 2014/0166815 A1* | 6/2014 | Dula | B64G 1/623 244/164 |
| 2021/0061381 A1* | 3/2021 | McGarey | B60B 15/00 |
| 2023/0227155 A1* | 7/2023 | Fu | B64G 1/16 244/2 |
| 2023/0249601 A1* | 8/2023 | Matthews | E02F 3/7609 180/204 |
| 2023/0286672 A1* | 9/2023 | Dougherty | B60G 3/207 |

* cited by examiner

*Primary Examiner* — Rodney A Bonnette
(74) *Attorney, Agent, or Firm* — Babst Calland; Thomas M. Joseph (57) ABSTRACT

A pair of opposing, spaced apart bracket assemblies is mounted on a lower surface of a landing vehicle deck with each bracket assembly having a latch receiver extending therefrom. A pair of opposing, spaced apart latch assemblies is mounted on an upper surface of an exploration vehicle with each latch assembly having a latch pivotally mounted for releasably engaging one of the bracket assembly latch receivers. A plurality of tethers with each tether releasably connecting one of plurality of wheels to the landing vehicle deck is provided. Each of the latch assembly latches pivots relative to the exploration vehicle upper surface to disengage from one of the bracket assembly latch receivers, so that the plurality of tethers suspend the exploration vehicle from the landing vehicle deck.

17 Claims, 9 Drawing Sheets

EXPLORATION VEHICLE STOWAGE AND DEPLOYMENT SYSTEMS

CROSS REFERENCE TO RELATED APPLICATION

This application claims the benefit under 35 U.S.C. § 119(e) of U.S. Provisional Application No. 63/413,288 entitled "EXPLORATION VEHICLE STOWAGE AND DEPLOYMENT SYSTEMS" filed Oct. 5, 2022, which is incorporated herein by reference.

STATEMENT REGARDING FEDERALLY SPONSORED RESEARCH OR DEVELOPMENT

This invention was developed under Contract No. 80LARC20C0009 awarded by the National Aeronautics and Space Administration. The Government has certain rights in this invention.

TECHNICAL FIELD

The subject disclosure is directed to systems, methods, and apparatus for stowing roving vehicles within landing vehicles and for deploying the roving vehicles therefrom.

BACKGROUND ART

Conventional space missions that include planetary and lunar rovers typically have two landings. The first landing occurs when a landing vehicle reaches a surface. The second landing occurs when a rover positioned within the landing vehicle has its wheels touch the ground, so that the rover can roll away.

These landings are preceded by violent shaking that occurs during a launch, which can disrupt the attachment of the rover to the landing vehicle. Moreover, the shaking can affect the placement of the rover within the landing vehicle, which can disrupt the mission because the release of the rover from the landing vehicle must be precise.

The process of attaching and releasing a rover to a landing vehicle is called stowage and deployment. Some conventional missions, such as the Lunokhod programme, the Mars Pathfinder mission, and the Chang'e 3 moon mission, have utilized rovers that have been "belly bolted" to their landing vehicles. These rovers utilized ramps to deploy to the surface.

Other proposed missions have explored the use of top-bolted rovers that could be drop-deployed to a landing surface. However, such rovers must free fall to the surface in an uncontrolled manner, which risks damage to the rover, as well as the potential for mission disruption due to improper placement of the rover on a planetary or lunar landing surface. Consequently, there is a need for an improved rover stowage and deployment system.

DISCLOSURE OF INVENTION

In various implementations, a system for deploying an exploration vehicle having a plurality of wheels from a landing vehicle having a deck thereon is provided. A pair of opposing, spaced apart bracket assemblies is mounted on a lower surface of the landing vehicle deck with each bracket assembly having a latch receiver extending therefrom. A pair of opposing, spaced apart latch assemblies is mounted on an upper surface of the exploration vehicle with each latch assembly having a latch pivotally mounted for releasably engaging one of the bracket assembly latch receivers. A plurality of tethers with each tether releasably connecting one of plurality of wheels to the landing vehicle deck is provided. Each of the latch assembly latches pivots relative to the exploration vehicle upper surface to disengage from one of the bracket assembly latch receivers, so that the plurality of tethers suspend the exploration vehicle from the landing vehicle deck.

MODES FOR CARRYING OUT THE INVENTION

The subject disclosure is directed to systems, methods, and apparatus for stowing and for deploying exploration vehicles in lunar and planetary missions in outer space. The system utilizes bracket assemblies that mount under a landing vehicle deck that releasably connect to corresponding latching assemblies that are mounted on a wheeled exploration vehicle. The exploration vehicle wheels are releasably tethered to the bracket assemblies, so that the exploration vehicle can be suspended when bracket assemblies disengage from the latching assemblies.

Then, the wheels can be rotated to lower the exploration vehicle to approach a landing surface on the tethers in a controlled manner. In some embodiments, the tethers automatically disengage from the wheels once they have fully unwrapped, allowing the exploration vehicle to drive away. In other embodiments, the exploration vehicle approaches the landing surface until it reaches a predetermined distance, so that it can drop the remaining distance therefrom in a safe, controlled manner.

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example can not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

Numerous specific details are set forth in order to provide a thorough understanding of one or more embodiments of the described subject matter. It is to be appreciated, however, that such embodiments can be practiced without these specific details.

Various features of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

Referring now to the drawings and, in particular, to FIGS. 1-8, there is shown a system, generally designated by the numeral 100, for stowing an exploration vehicle 110 within a landing vehicle 112 and for deploying the exploration vehicle 110 therefrom. The landing vehicle 112 includes a deck 114. The exploration vehicle 110 includes a plurality of wheels 116.

The system 100 provides a mechanical connection, an electrical connection, and a data connection between the exploration vehicle 110 and the landing vehicle 112 that can be customized to the lander bolt patterns without changing the configuration of the exploration vehicle 110. Further, the electrical connection can be configured to accommodate different pin out connections required by the landing vehicle 112.

The landing vehicle 112 includes a pair of opposing, spaced apart bracket assemblies 118-120 that mounted on a lower surface 122 of the deck 114. The bracket assemblies 118-120 can be thermally isolated from the deck 114. The exploration vehicle 110 includes a pair of opposing, spaced apart latch assemblies 124-126 mounted on an upper surface 128 on a chassis 130.

The bracket assemblies 118 releasably connect to the latch assemblies 124-126, so that the exploration vehicle 110 is releasably connected to the landing vehicle 112. The bracket assemblies 118 include a plurality of tethers 132 that can suspend the exploration vehicle 110 therefrom.

The tethers 132 are releasably connected to the wheels 116 in tension. The tension must be maintained during launch to avoid cable release. The tethers 132 can be made from any suitable material. In this exemplary embodiment, the tethers 132 are made from Kevlar.

The exploration vehicle 110 can disengage from the landing vehicle 112 after the landing vehicle 112 lands on a surface (not shown). Then, the wheels 116 can rotate using their driving actuators to lower the exploration vehicle 110 to a predetermined distance from the surface at which the tether length is fully let out, causing the tethers to automatically release and drop the exploration vehicle to the surface.

The rotation of the wheels 116 provides for a controlled, cabled descent to a surface, so that the exploration vehicle 110 can easily descend onto varied terrain from various lander deck positions.

The exploration vehicle 110 can be a lunar vehicle, an extraterrestrial exploration vehicle, a robotic vehicle, a roving vehicle, and/or a rover. Exemplary exploration vehicles 110 include various embodiments of CUBEROVER® robotic exploration vehicles, such as the 2U CUBEROVER® EM rover, the 2U CUBEROVER® FM rover, the Bottom-Mount CUBEROVER® rover, the 4U CUBEROVER® rovers, the 6U, and/or the CUBEROVER® rovers. CUBEROVER® is a registered trademark of Astrobotic Technology, Inc. of Pittsburgh, Pennsylvania.

The exploration vehicle 110 and chassis 130 can have other configurations and features, such as the CMU IRIS rover, rovers that include front and back avionics, rovers that include front and back curved surfaces, rovers that include a fuselage and a bulkhead, and rovers that include flat-panel avionics.

Figure 1:
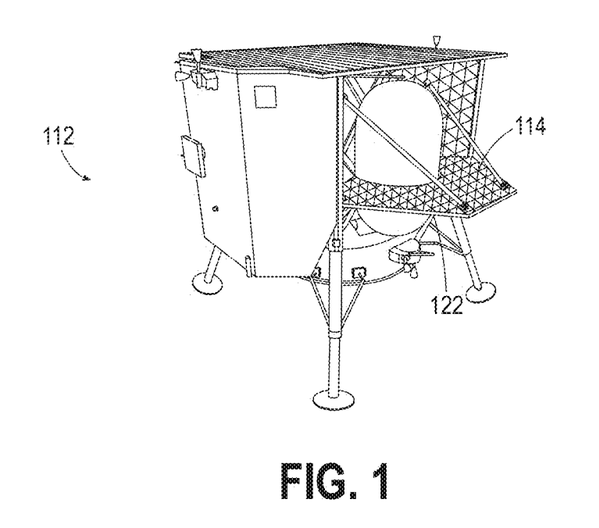
FIG. 1 is a perspective view of a landing vehicle in accordance with the subject disclosure.
Figure 2:
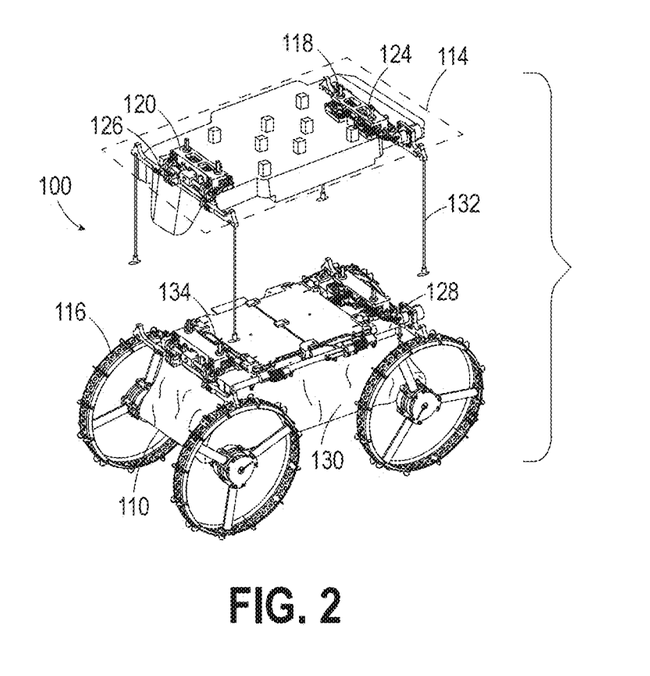
FIG. 2 is an exploded perspective view of an exploration vehicle connected to a landing vehicle deck (shown in phantom) in accordance with the subject disclosure.

As shown in FIG. 2, an upper portion of the exploration vehicle 110 can define a compartment 134 for holding a solar array that is stowed underneath the deck 114 when the exploration vehicle 110 is connected to the landing vehicle 112. The solar array can have various panel configurations, such as a single panel, a vertical bi-panel, or a tri-panel. In some embodiments, compressible members can be positioned over the solar array to damp vibrations during a launch.

The landing vehicle 112 can be, for example, any landing vehicle that provides under-deck stowage and deployment options. In this exemplary embodiment, the landing vehicle 112 can be a PEREGRINE™ landing vehicle. PEREGRINE™ is a trademark of Astrobotic Technology, Inc. of Pittsburgh, Pennsylvania. Other exemplary landing vehicles include the XL-1 lander by Masten Space Systems of Mojave, the Z-01 lander by Orbit Beyond, Inc. of Edison, New Jersey, and/or the Dynetics Human Lander System by Dynetics of Huntsville, Alabama.

Other exemplary embodiments can include a landing vehicle 112 that includes a landing vehicle having vertical mounting surfaces, such as the Intuitive Machines NOVA-C lander by Intuitive Machines, LLC of Houston, Texas. In such embodiments, a panel can be hinged at its lower end and can be oriented, vertically, on the landing vehicle 112 to provide a mounting deck surface for the exploration vehicle 110. Using this configuration, the mounting deck surface can be rotated along its hinge from its vertical stowed position to a horizontal position once the landing vehicle 112 reaches a landing surface. Then, the exploration vehicle 110 can be deployed in a similar manner to landing vehicles that have the under-deck stowage and deployment options.

Figure 3:
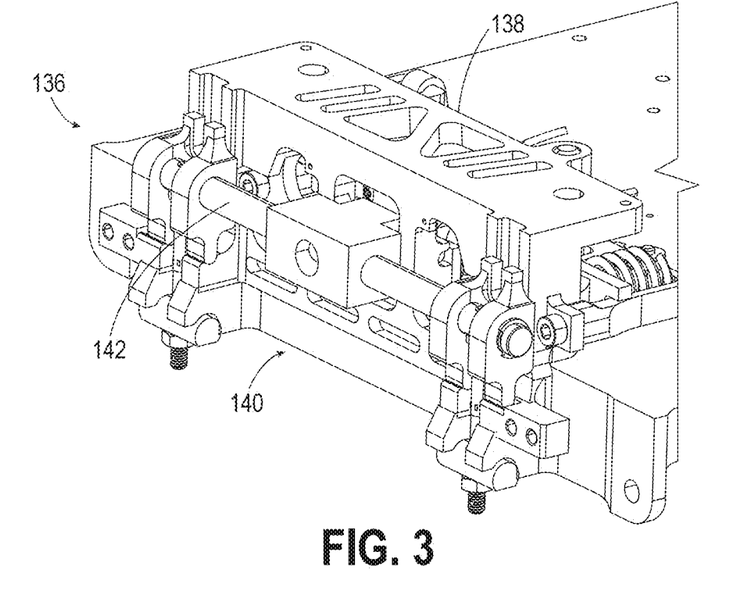
FIG. 3 is a fragmentary perspective view of a latch mechanism in accordance with the subject disclosure.
Figure 4:
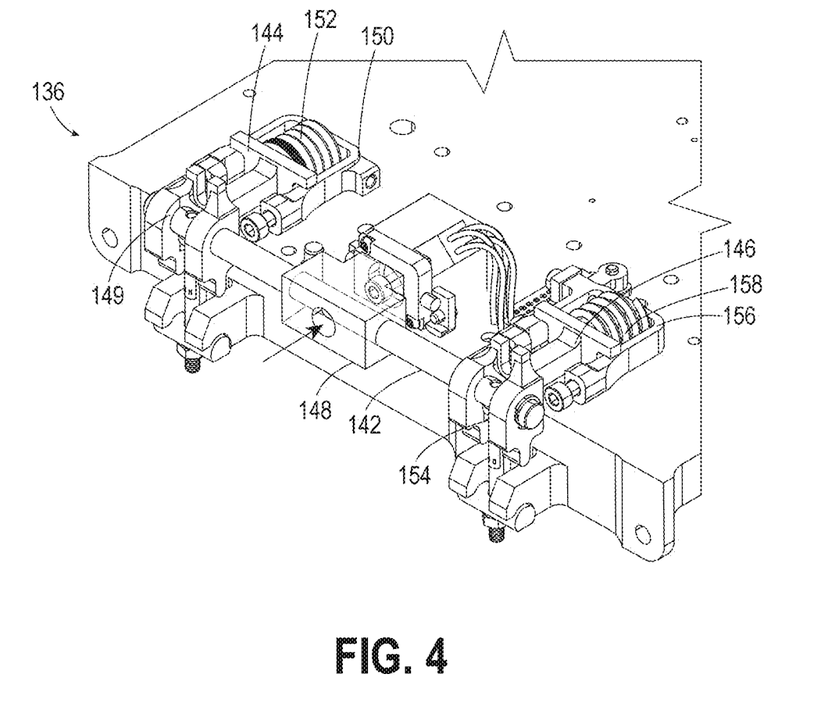
FIG. 4 is another fragmentary perspective view of the latch mechanism shown in FIG. 3.

The system 100 can include an exemplary mechanical interface 136, as shown in FIGS. 3-4. The mechanical interface 136 can include a bracket assembly 138 and a latch assembly 140. In this exemplary embodiment, the latch assembly 140 includes a latch 142, a pair of spring-loaded latch mechanisms 144-146 and a nut-release Hold Down and Release Mechanism (HDRM) 148. The latch 142 is pivotally connected to the exploration vehicle 110.

The latch mechanism 144 includes a custom clamping bolt 149 and a spring assembly 150 having a pusher spring 152 therein. The latch mechanism 146 includes a custom clamping bolt 154 and a spring assembly 156 having a pusher spring 158 therein. In some embodiments, the pusher springs 152 and 158 can store about 1.5 in-lb. per spring of energy.

Figures 5, 6:
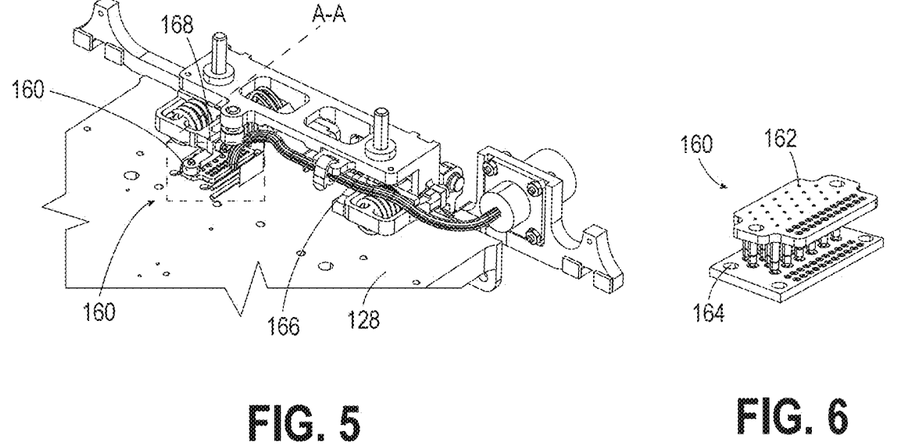
FIG. 5 is a fragmentary perspective view of a latch assembly mounted on an exploration vehicle in accordance with the subject disclosure.
FIG. 6 is a perspective view of the electrical interface shown in Section A-A in FIG. 5.

The system 100 can include an exemplary electrical interface 160, as shown in FIGS. 5-6, positioned at the front and rear of the exploration vehicle 110. In this exemplary embodiment, the electrical interface 160 on the front of the exploration vehicle consists of pogo spring pins mounted to a Printed Circuit Board (PCB) 162 that extends from the front and rear bracket assemblies 118-120, as shown in FIG. 5, and a target PCB 164 that is mounted on the exploration vehicle 110.

On the front of the exploration vehicle 110, a wire harness comprising a plurality of electrical cables 166 and a connector 168 connect the pogo pin PCB 162 to the landing vehicle 112 and to the front Hold Down Release Mechanism 148. The electrical interface 160 on the rear of the exploration vehicle connects only to the rear HDRM. The cables 166 can supply electricity from the landing vehicle 112 to the exploration vehicle 110. In some embodiments, the cables 166 can send data, optical signals, and other telecommunication signals through the connection through the electrical interface 160.

The pogo pin PCB 162 can include wires that connect to both the front HDRM 148 and to the target PCB 164. that mates with a connector coming from the lander. A pogo pin PCB (not shown) on the rear bracket assembly 120 has wires that connect to the rear HDRM. The HDRM release bolt is an interface between the latch assembly and the bracket assembly.

Figure 7:
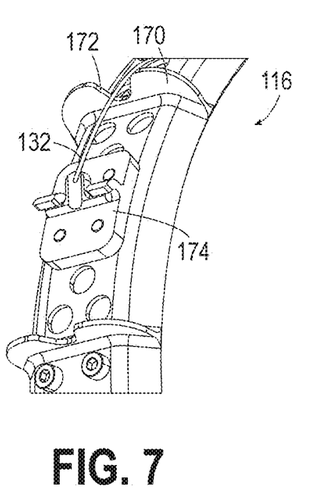
FIG. 7 is a fragmentary view of an exploration vehicle wheel with tether release mechanism in accordance with the subject disclosure.
Figure 8:
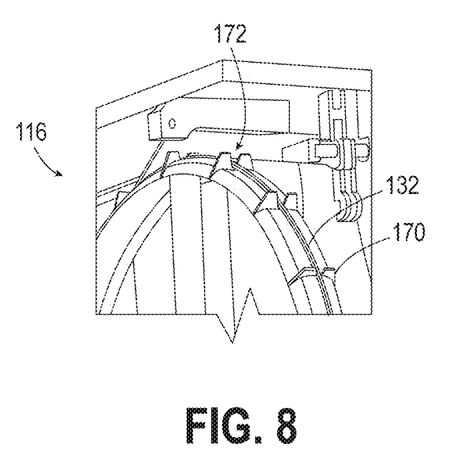
FIG. 8 is another fragmentary view of the exploration vehicle wheel shown in FIG. 7.

The wheels 116 that can have various configurations and/or features, including sheet metal rims, 3D printed rims/spokes, CNC machined rims, and/or variations thereof. As shown in FIGS. 7-8, each wheel 116 includes a plurality of grousers 170. Each of the grousers 170 includes a notch 172 for receiving one of the tethers 132. Each of the wheels 116 includes a t-connector 174 to releasably attach the tethers 132 to the exploration vehicle 110.

Figure 9:
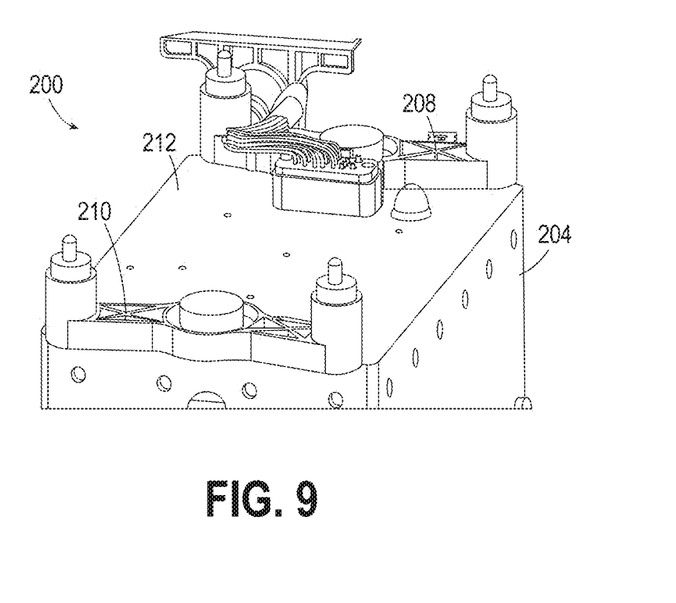
FIG. 9 is a fragmentary view of a release mechanism assembly is accordance with the subject disclosure.
Figure 10:
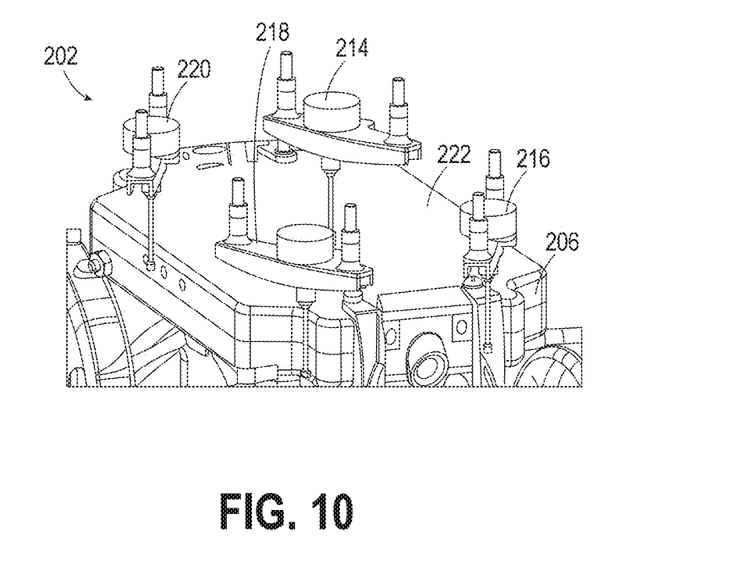
FIG. 10 is a fragmentary view of another release mechanism assembly in accordance with the subject disclosure

Referring now to FIGS. 9-10, other embodiments of release mechanism assemblies, generally designated as numerals 200 and 202 are shown. The release mechanism assembly 200 is mounted on an exploration vehicle 204. The release mechanism assembly 202 is mounted on an exploration vehicle 206.

The release mechanism assembly 200 includes a pair of release mechanisms 208-210 mounted on opposite ends of an upper surface 212 of the exploration vehicle 204. The release mechanisms 208-210 include HDRMs.

The release mechanism assembly 202 includes four release mechanisms 214-220 mounted at each corner of an upper surface 222 of the exploration vehicle 206. The release mechanisms 214-220 include HDRMs.

Figure 11:
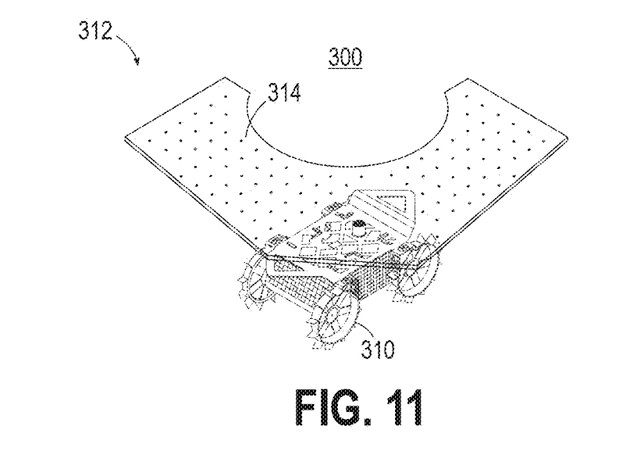
FIG. 11 is a perspective view of another embodiment of an exploration vehicle connected to a landing vehicle deck in accordance with the subject disclosure.
Figure 12:
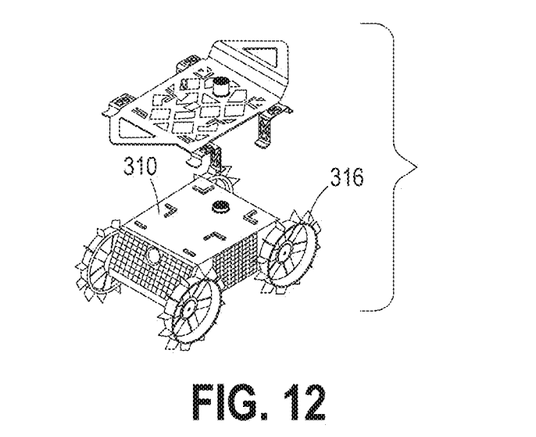
FIG. 12 is an exploded view of the exploration vehicle shown in FIG. 11 connecting to a landing vehicle bracket assembly in accordance with the subject disclosure.
Figure 13:
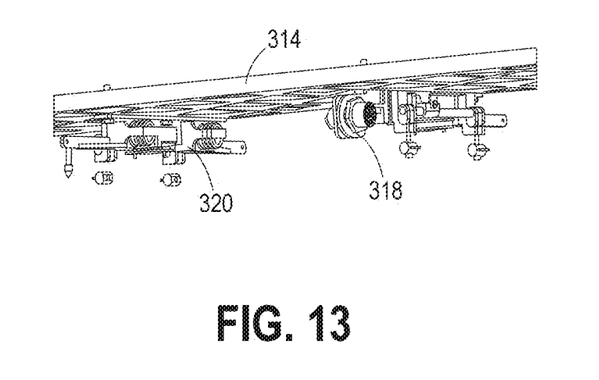
FIG. 13 is a fragmentary perspective view of a pair of bracket assemblies mounted on a landing vehicle deck in accordance with the subject disclosure.

Referring now to FIGS. 11-12 with continuing reference to the foregoing figures, there is shown another embodiment of a system, generally designated by the numeral 300, for stowing an exploration vehicle 310 within a landing vehicle 312 and for deploying the exploration vehicle 310 therefrom. Like the embodiment shown in FIGS. 1-8, the landing vehicle 312 includes a deck 314. The exploration vehicle 310 includes a plurality of wheels 316.

Figures 14, 15:
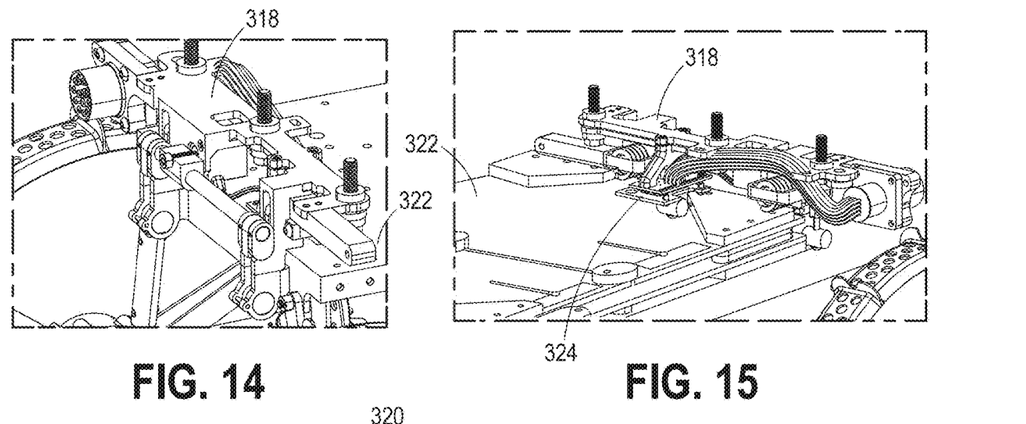
FIG. 14 is a fragmentary perspective view of the landing vehicle-exploration vehicle connection, mid-release, for the exploration vehicle stowage and deployment system shown in FIG. 3.
FIG. 15 is a fragmentary perspective view of an electrical connection interface for an exploration vehicle stowage and deployment system shown in FIG. 3.
Figure 16:
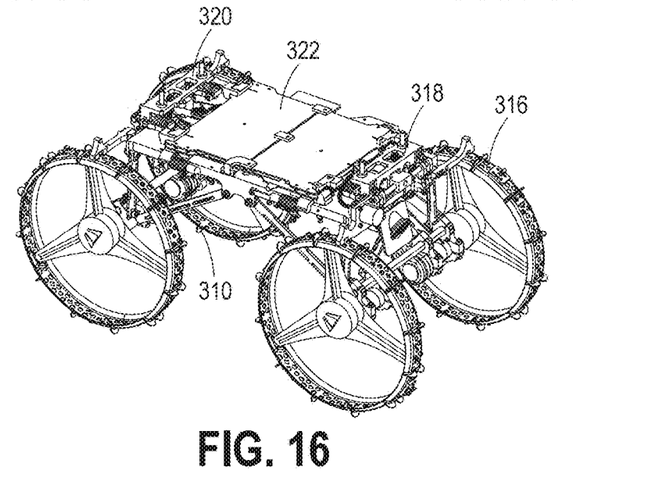
FIG. 16 is a perspective view of an exploration vehicle having a pair of latching assemblies mounted thereon with each of the latching assemblies being connected to a bracket assembly in accordance with the subject disclosure.

Referring now to FIGS. 14-16 with continuing reference to the foregoing figures, mechanical interfaces, generally designated by the numerals 318-320, are shown. The mechanical interfaces 318-320 are latch & lock mechanisms.

The mechanical interface 318 includes an electrical interface 324 that can function in the same manner as the electrical interface 160 shown in FIGS. 5-6. Specifically, the electrical interface 324 connects electrically with the exploration vehicle 310 through a set of spring-loaded electrical pins and through the landing vehicle 312 using a standard electrical connector (not shown).

Figure 17:
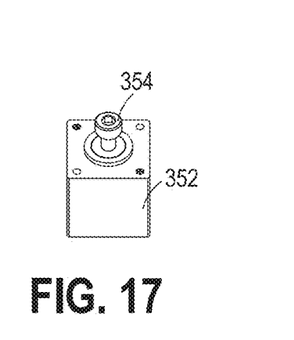
FIG. 17 is a perspective view of a release mechanism in accordance with the subject disclosure.
Figure 18:
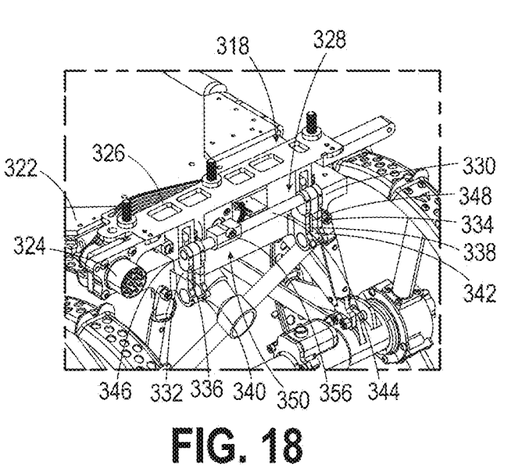
FIG. 18 is a fragmentary view of one of the latching assemblies and the bracket assemblies shown in FIG. 16.
Figure 19:
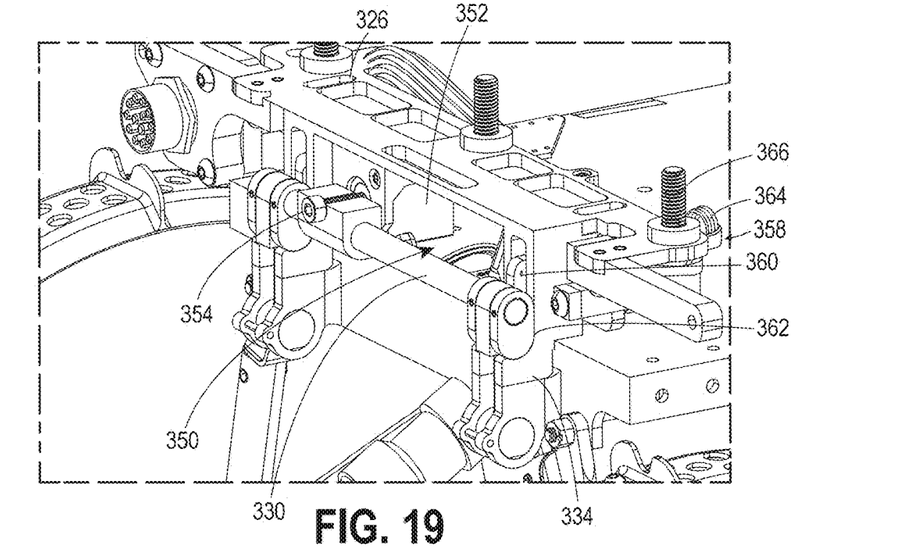
FIG. 19 is another fragmentary view of one of the latching assemblies and the bracket assemblies shown in FIG. 16.

Referring now to FIGS. 17-19 with continuing reference to the foregoing figures, a mechanical interface, generally designated by the numeral 318 is shown. The mechanical interface 318 includes a bracket assembly 326 and a latch assembly 328.

The latch assembly 328 includes a latch 330 applies a preload force that is adjusted to ensure a solid connection exists between the exploration vehicle 310 and the bracket when the system is exposed to the vibrations of launch. The latch 330 is pivotally connected to latch assembly 328 to pivot relative to the upper surface 322.

The latch 330 releasably connects to the bracket assembly 326 to connect the exploration vehicle 310 to the landing vehicle 312. The latch 330 connects to the bracket assembly 326 engages a pair of latch receivers 332-334. In this exemplary embodiment, the latch receivers 332-334 are hooks. In some embodiments, the hooks can be lubricated The latch 330 includes a pair of elongated members 336-338 that are connected at pivot points 340-342. A latch rod 344 connects the members 336-338 to one another. The members 336-338 engage the latch receivers 332-334 with passive hinges 346-348 that can pivot out of the hooks. In this exemplary embodiment, the elongated members 336-338 are tensioning bolts that are set to a specific tension, designed to maintain a preload force on the latch receivers 332-334 that is larger than all expected vertical acceleration loads experienced during launch.

A retaining assembly 350 is positioned at the center of the latch rod 344. The retaining assembly 350 can include a release bolt mechanism 352 with a release bolt 354 mounted on the bracket assembly 326 and a latch retainer 356 on the latch rod 344, which is part of the latch assembly 328. The release bolt mechanism 352 can be triggered by an actuating device (not shown) that activates the release bolt mechanism 352 in response to a signal to disengage the release bolt 354 from the latch retainer 356. In some embodiments, an Earth-based mission operations center will communicate w/the exploration vehicle 110 to trigger the activation of an HDRM current through pogo pins.

The release bolt mechanism 352 can be an off-the-shelf HDRM that holds the latch 330 in place while the exploration vehicle 310 is mounted to the landing vehicle 312. In this exemplary embodiment, the release bolt mechanism is resettable for up to 100 cycles.

As shown in FIG. 19, the system 300 includes a pair of push rod assemblies, such as spring assembly 358 mounted within the bracket assembly 326. The bracket assembly 326 includes a push rod 360 that drive the latch 330 to disengage therefrom. The latch 330 can disengage from the latch receiver 334 by pivoting a pivot rod 362 out of the hook. The spring assembly 358 includes a spring 364 for driving the push rod 360.

The bracket assembly 326 includes a plurality of bracket bolts 366 that attach the exploration vehicle 310 to the landing vehicle 312. The bolts 366 connect the bracket assembly 326 to the deck 314. The bracket assembly 326 is thermally isolated from the deck 314 using thermal spacers at each of the bolts 366.

Figure 20:
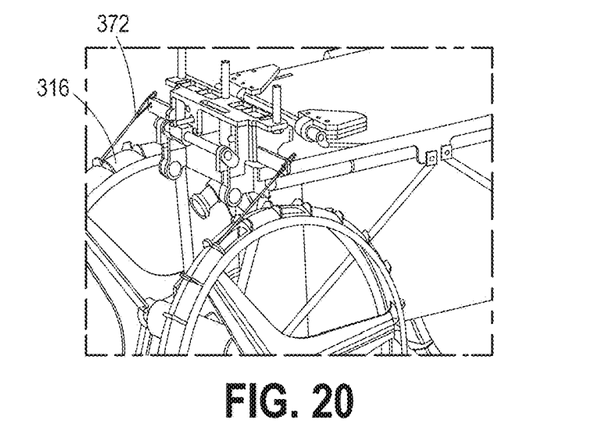
FIG. 20 is another fragmentary view of one of the latching assemblies and the bracket assemblies shown in FIG. 16 illustrating the connection to two exploration vehicle wheels.
Figure 21:
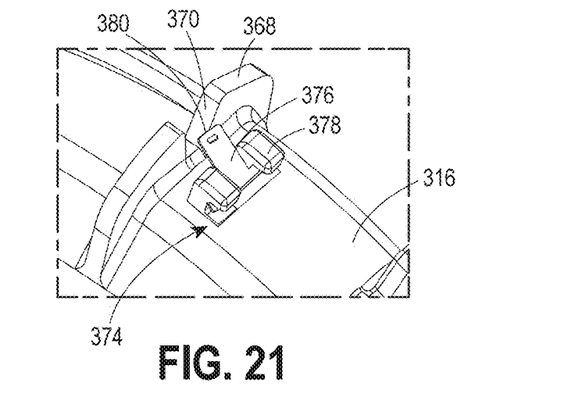
FIG. 21 is a fragmentary view of an exploration vehicle wheel, illustrating the tether captivation and release mechanism, in accordance with the subject disclosure.
Figure 22:
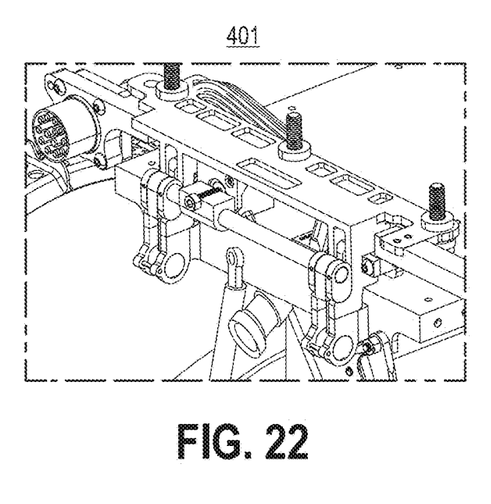
FIGS. 22-25 illustrate a four step sequence for deploying the latching assembly in accordance with the subject disclosure.
Figure 23:
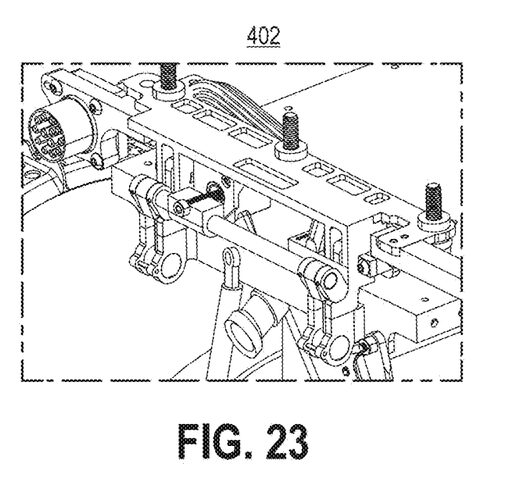
Figure 24:
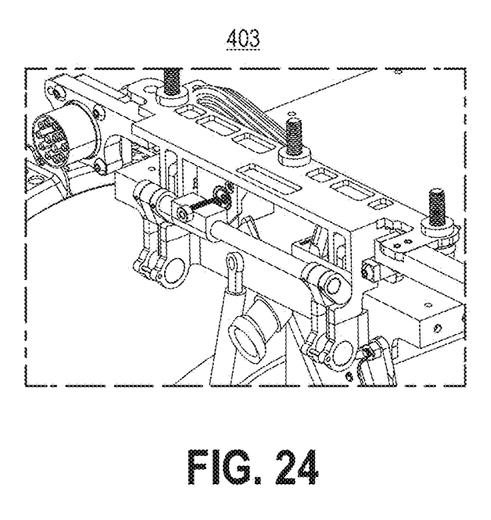
Figure 25:
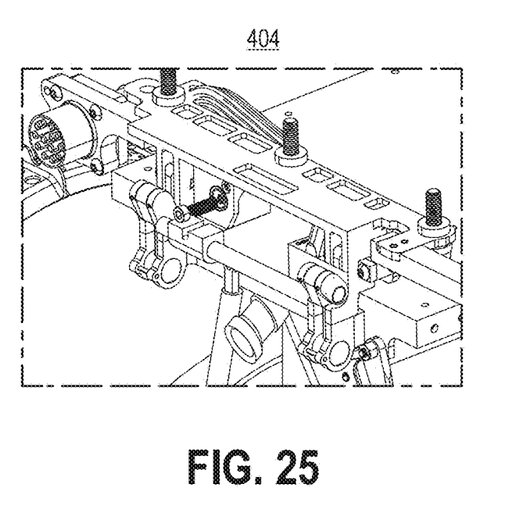

Referring now to FIGS. 20-21 with continuing reference to the foregoing figures, the wheels 316 includes a plurality of grousers 368. Each of the grousers 368 includes a notch 370 for receiving a tether 372 that releasably attaches each of the wheels 316 to the landing vehicle 312. The connection is facilitated with a fastening system 374, which includes a release hook 376, a hook clevis 378, and an attachment loop 380. In this exemplary embodiment, the tether 372 is made from Kevlar, has a 0.29 mm diameter, has a strength of 59 lbf, has 1.6 wraps per 1 m descent, and a density of 0.095 grams per m.

When the latch 330 is released, the exploration vehicle 310 can drop a distance of approximately 1 cm until each of the wheel 316 are suspended from the tethers 372. The tethers 372 are permanently affixed at the bracket assemblies, including bracket assembly 326, at one end. The opposite ends are wrapped around the wheels 316 within the notches, such as notch 370, and eventually terminates at a fastening system, such as the fastening system 374.

By rotating the wheels 316 slowly in a coordinated manner, the exploration vehicle 310 can slowly lower itself in a controlled manner. The length of the thread is designed so that the fastening system 374 will remain engaged until the exploration vehicle 310 is within one half wheel diameter (10 cm) of the surface assuming the "most compressed case" for the landing vehicle legs (not shown). When the fastening system 374 disengage the exploration vehicle 310 free-falls the remaining distance to a safe, stable, and low impact landing on the surface.

Referring to FIGS. 22-25 with continuing reference to the foregoing figures, a four-step sequence for deploying an exploration vehicle from a landing vehicle in accordance with the subject disclosure. At 401, an exploration vehicle is in a locked position within a landing vehicle. At 402, a latch rotates to release the exploration vehicle from the landing vehicle. At 403, push rods continue to move to pivot the latch. At 404, the landing vehicle drops the exploration vehicle, so that the exploration vehicle can begin its controlled descent.

Figure 26:
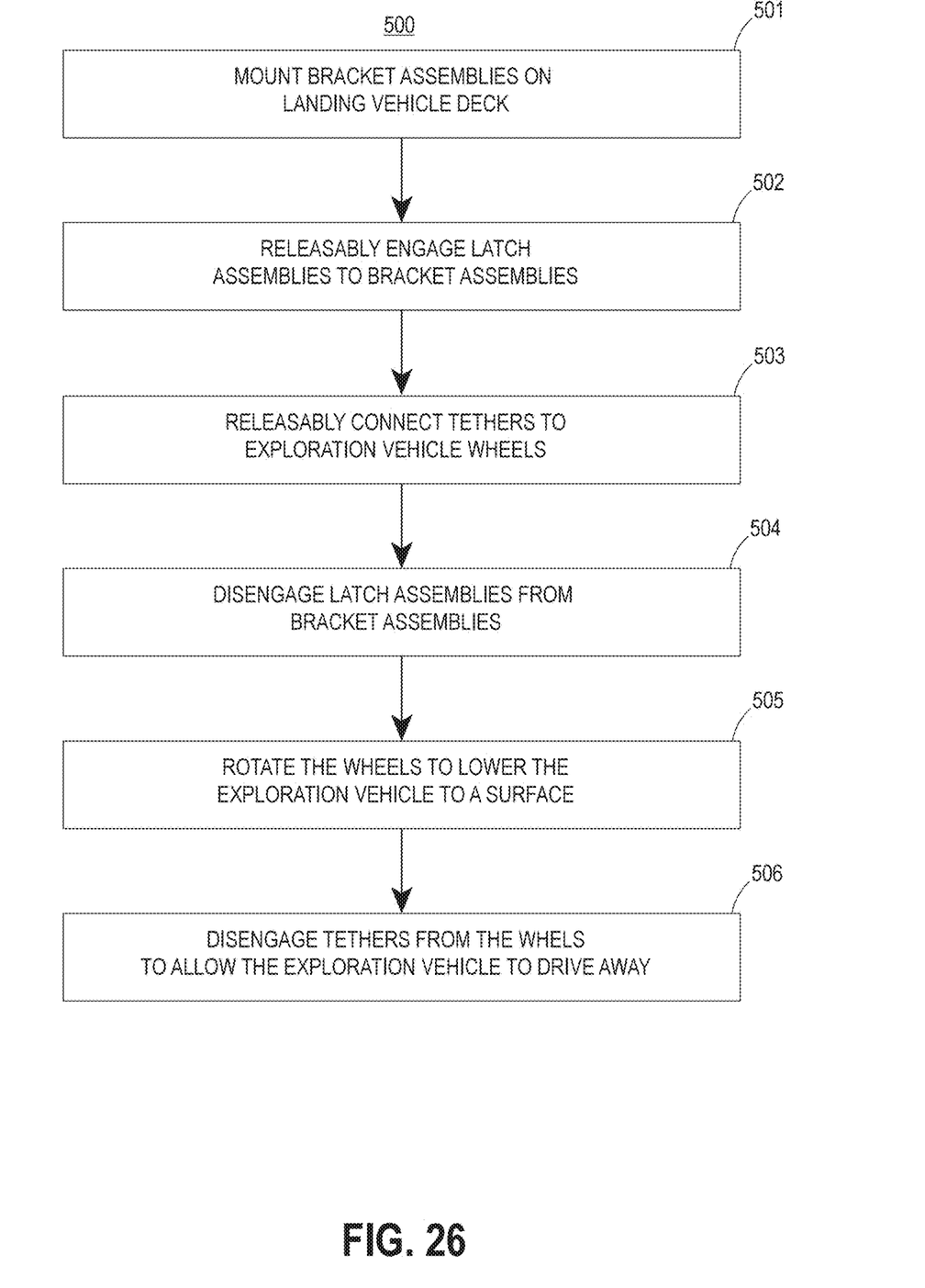
FIG. 26 is an exemplary process in accordance with the subject disclosure.

Referring to FIG. 26 with continuing reference to the foregoing figures, an exemplary process, generally designated by the numeral 500, for stowing and for deploying an exploration vehicle from a landing vehicle is shown. The process 500 can be performed using the system 100 shown in FIGS. 1-8 and/or the system 300 shown in FIGS. 11-21.

At 501, a pair of opposing, spaced apart bracket assemblies are mounted on a lower surface of the landing vehicle deck with each bracket assembly having a latch receiver extending therefrom. In this exemplary embodiment, the deck can be the deck 114 shown in FIGS. 1-8 and/or the deck 314 shown in FIGS. 11-21. The bracket assemblies can be the bracket assemblies 118-120 shown in FIGS. 1-8 and/or the bracket assembly 326 shown in FIGS. 13-21

At 502, each of a pair of latches are releasably engaged to one of the bracket assembly latch receivers to connect a pair of latch assemblies extending from an upper surface of the exploration vehicle to the bracket assemblies. In this exemplary embodiment, the latch assemblies can be the latch assemblies 124-126 shown in FIGS. 1-8 and/or the latch assembly 328 shown in FIGS. 13-21.

At 503, each of a plurality of tethers is releasably connected to one of the plurality of wheels. In this exemplary embodiment, the tethers can be the tethers 132 shown in FIGS. 1-8 and/or the tethers 372 shown in FIGS. 11-21. The wheels can be the wheels 116 shown in FIGS. 1-8 and/or the wheels 316 shown in FIGS. 20-21.

At 504, each of the latch assembly latches are pivoted relative to the exploration vehicle upper surface to disengage the latch assembly latches from the bracket assembly latch receivers after the landing vehicle lands on a surface, so that the plurality of tethers suspend the exploration vehicle from the landing vehicle deck. In this exemplary embodiment, the latches can be the latch 142 shown in FIGS. 1-8 and/or the latch 330 shown in FIGS. 13-21.

At 505, the plurality of wheels can be rotated to extend the plurality of tethers and to lower the exploration vehicle to a predetermined distance from the landing surface to drop thereon. In this exemplary embodiment, the exploration vehicle can be the exploration vehicle 110 shown in FIGS. 1-8 and/or the exploration vehicle 310 shown in FIGS. 14-21.

At 506, tethers are disengaged from the plurality of wheels to allow the exploration vehicle to drive away in an optional step for some embodiments. In other embodiments, the exploration vehicle approaches the landing surface until it reaches a predetermined distance, so that it can drop the remaining distance therefrom in a safe, controlled manner.

Supported Features and Embodiments

Supported embodiments can provide various attendant and/or technical advantages in terms of stowing rovers with landing vehicles and deploying such rovers therefrom. Supported embodiments include a system for deploying an exploration vehicle having a plurality of wheels from a landing vehicle having a deck thereon, the system comprising: a pair of opposing, spaced apart bracket assemblies mounted on a lower surface of the landing vehicle deck with each bracket assembly having a latch receiver extending therefrom; a pair of opposing, spaced apart latch assemblies mounted on an upper surface of the exploration vehicle with each latch assembly having a latch pivotally mounted for releasably engaging one of the bracket assembly latch receivers; and a plurality of tethers with each tether releasably connecting one of plurality of wheels to the bracket assemblies; wherein each of the latch assembly latches pivots relative to the exploration vehicle upper surface to disengage from one of the bracket assembly latch receivers after the landing vehicle lands on a landing surface, so that the plurality of tethers suspend the exploration vehicle from the bracket assemblies.

Supported embodiments include the foregoing system, wherein the plurality of wheels rotate to extend the plurality of tethers and to lower the exploration vehicle to a predetermined distance from a landing surface to drop thereon.

Supported embodiments include any of the foregoing systems, wherein each of the plurality of tethers automatically disengages from each of the plurality of wheels to allow the exploration vehicle to drive on a landing surface.

Supported embodiments include any of the foregoing systems, wherein each of the plurality of latches includes a pair of elongated members pivotally connected to the exploration vehicle upper surface and a connecting rod to connect each of the pair of elongated members to one another; and where each of the bracket assembly latch receivers is one of a pair of latch receivers extending therefrom to receive one of the latch assemblies latch elongated members.

Supported embodiments include any of the foregoing systems, wherein each of the pair of bracket assemblies includes a pair of push rods for driving the latch assembly latches to disengage from the bracket assembly latch receivers.

Supported embodiments include any of the foregoing systems, wherein each of the pair of bracket assemblies include a pair of spring assemblies with each of the pair of spring assemblies being mounted thereon to drive one of the pair of push rods.

Supported embodiments include any of the foregoing systems, further comprising: a retaining assembly having a release bolt mechanism with a release bolt therein mounted on one of the bracket assemblies and a latch retainer mounted on one of connecting rods and for receiving the release bolt.

Supported embodiments include any of the foregoing systems, wherein the retaining assembly communicates with an actuating device to activate the release bolt mechanism in response to a signal to disengage the release bolt from the latch retainer.

Supported embodiments include any of the foregoing systems, wherein one of the bracket assemblies has an electrical interface assembly for supplying energy to the exploration vehicle for the landing vehicle.

Supported embodiments include any of the foregoing systems, wherein the bracket assembly electrical interface assembly includes a printed circuit board, a target printed circuit board, and a plurality of pins releasably connecting the printed circuit board to the target printed circuit board.

Supported embodiments include any of the foregoing systems, wherein each of the plurality of wheels includes a t-connector to releasably attach one of the plurality of tethers to the exploration vehicle.

Supported embodiments include any of the foregoing systems, wherein each of the plurality of wheels includes a plurality of grousers with each of the grousers having a notch therein to receive one of the plurality of tethers therein.

Supported embodiments include any of the foregoing systems, wherein each of the bracket assemblies connects to the landing vehicle deck with a plurality of attachment bolts.

Supported embodiments include any of the foregoing systems, wherein each of the plurality of attachment bolts includes a thermal spacer to thermally isolate each of the bracket assemblies from the landing vehicle deck.

Supported embodiments include any of the foregoing systems, wherein the exploration vehicle is a rover.

Supported embodiments include any of the foregoing systems, wherein the rover includes a frame and a foldable solar array mounted thereon with the foldable array being positioned between the frame and the landing vehicle deck when the bracket assemblies engage the latch assemblies.

Supported embodiments include any of the foregoing systems, further comprising a layer of compressible members positioned between the foldable solar array and the landing vehicle deck to damp vibrations.

Supported embodiments include any of the foregoing systems, further comprising a plurality of deployment spools mounted on the exploration vehicle with each of the plurality of tethers being wrapped around on one of the plurality of deployment stools.

Supported embodiments include a method for deploying an exploration vehicle having a plurality of wheels from a landing vehicle having a deck thereon, the method comprising: mounting a pair of opposing, spaced apart bracket assemblies on a lower surface of the landing vehicle deck with each bracket assembly having a latch receiver extending therefrom; releasably engaging each of a pair of latches to one of the bracket assembly latch receivers to connect a pair of latch assemblies extending from an upper surface of the exploration vehicle to the bracket assemblies; releasably connecting each of a plurality of tethers to one of the plurality of wheels; pivoting each of the latch assembly latches relative to the exploration vehicle upper surface to disengage the latch assembly latches from the bracket assembly latch receivers, so that the plurality of tethers suspend the exploration vehicle from the landing vehicle deck; and rotating the plurality of wheels to extend the plurality of tethers and to lower the exploration vehicle to a predetermined distance from the landing surface to drop thereon.

Supported embodiments include the foregoing method, further comprising: driving a push rod from each of the pair of bracket assemblies to pivot the pair of latches to disengage the latches from the bracket assembly latch receivers.

Supported embodiments include any of the foregoing methods, further comprising: actuating each of the push rods with a spring assembly.

Supported embodiments include any of the foregoing methods, further comprising: disconnecting a retaining bolt within a retaining bolt mechanism extending from one of the pair of bracket assemblies from a latch retainer mounted on one of the pair of latches to disengage exploration vehicle from the landing vehicle.

Supported embodiments include any of the foregoing methods, further comprising: activating the release bolt mechanism in response to a signal to disconnect the release bolt from the latch retainer.

Supported embodiments include any of the foregoing methods, further comprising: supplying electrical energy from the landing vehicle to the exploration vehicle through an electrical interface.

Supported embodiments include any of the foregoing methods, further comprising: thermally isolating the pair of bracket assemblies from the landing vehicle deck.

Supported embodiments include any of the foregoing methods, wherein the exploration vehicle is a vehicle selected from the group consisting of a lunar vehicle, an extraterrestrial exploration vehicle, a robotic vehicle, and a roving vehicle.

Supported embodiments include a system for deploying an exploration vehicle having a plurality of wheels from a landing vehicle having a deck thereon, the system comprising: a pair of opposing, spaced apart bracket assemblies mounted on a lower surface of the landing vehicle deck; a pair of opposing, spaced apart latch assemblies mounted on an upper surface of the exploration vehicle with the each of the latch assemblies having connecting means for releasably connecting to one of the bracket assemblies; suspending means for suspending the exploration vehicle from the landing vehicle deck; and disengaging means for disengaging the exploration vehicle from the landing vehicle.

Supported embodiments include a device, an apparatus, and/or means for implementing any of the foregoing systems, methods, or portions thereof.

The detailed description provided above in connection with the appended drawings is intended as a description of examples and is not intended to represent the only forms in which the present examples can be constructed or utilized. It is to be understood that the configurations and/or approaches described herein are exemplary in nature, and that the described embodiments, implementations and/or examples are not to be considered in a limiting sense, because numerous variations are possible.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. A system for deploying an exploration vehicle having a plurality of wheels from a landing vehicle having a deck thereon, the system comprising:
    a pair of opposing, spaced apart bracket assemblies mounted on a lower surface of the landing vehicle deck with each bracket assembly having a latch receiver extending therefrom;
    a pair of opposing, spaced apart latch assemblies mounted on an upper surface of the exploration vehicle with each latch assembly having a latch pivotally mounted for releasably engaging one of the bracket assembly latch receivers; and
    a plurality of tethers with each tether releasably connecting one of plurality of wheels to the landing vehicle deck;
    wherein each of the latch assembly latches pivots relative to the exploration vehicle upper surface to disengage from one of the bracket assembly latch receivers, so that the plurality of tethers suspend the exploration vehicle from the landing vehicle deck.

2. The system of claim 1, wherein the plurality of wheels rotate to extend the plurality of tethers and to lower the exploration vehicle to a predetermined distance from a landing surface to drop thereon.

3. The system of claim 1, wherein each of the plurality of tethers automatically disengages from each of the plurality of wheels to allow the exploration vehicle to drive on a landing surface.

4. The system of claim 1, wherein each latch includes a pair of elongated members pivotally connected to the exploration vehicle upper surface and a connecting rod to connect each of the pair of elongated members to one another; and where each of the bracket assembly latch receivers is one of a pair of latch receivers extending therefrom to receive one of the latch assemblies latch elongated members.

5. The system of claim 4, wherein each of the pair of bracket assemblies includes a pair of push rods for driving the latch assembly latches to disengage from the bracket assembly latch receivers.

6. The system of claim 5, wherein each of the pair of bracket assemblies include a pair of spring assemblies with each of the pair of spring assemblies being mounted thereon to drive one of the pair of push rods.

7. The system of claim 4, further comprising:
    a retaining assembly having a release bolt mechanism with a release bolt therein mounted on one of the bracket assemblies and a latch retainer mounted on one of connecting rods and for receiving the release bolt.

8. The system of claim 7, wherein the retaining assembly communicates with an actuating device to activate the release bolt mechanism in response to a signal to disengage the release bolt from the latch retainer.

9. The system of claim 1, wherein one of the bracket assemblies has an electrical interface assembly to supply energy to the exploration vehicle from the landing vehicle.

10. The system of claim 9, wherein the bracket assembly electrical interface assembly includes a printed circuit board, a target printed circuit board, and a plurality of pins releasably connecting the printed circuit board to the target printed circuit board.

11. The system of claim 1, wherein each of the plurality of wheels includes a t-connector to releasably attach one of the plurality of tethers to the exploration vehicle.

12. The system of claim 1, wherein each of the plurality of wheels includes a plurality of grousers with each of the grousers having a notch therein to receive one of the plurality of tethers therein.

13. The system of claim 1, wherein each of the plurality of tethers are releaseable tethers.

14. The system of claim 13, wherein each of the plurality of attachment bolts includes a thermal spacer to thermally isolate each of the bracket assemblies from the landing vehicle deck.

15. The system of claim 1, wherein the exploration vehicle is a rover.

16. The system of claim 15, wherein the rover includes a frame and a foldable solar array mounted thereon with the foldable array being positioned between the frame and the landing vehicle deck when the bracket assemblies engage the latch assemblies.

17. A method for deploying an exploration vehicle having a plurality of wheels from a landing vehicle having a deck thereon, the method comprising:
    mounting a pair of opposing, spaced apart bracket assemblies on a lower surface of the landing vehicle deck with each bracket assembly having a latch receiver extending therefrom;
    releasably engaging each of a pair of latches to one of the bracket assembly latch receivers to connect a pair of latch assemblies extending from an upper surface of the exploration vehicle to the bracket assemblies;
    releasably connecting each of a plurality of tethers to one of the plurality of wheels; pivoting each of the latch assembly latches relative to the exploration vehicle upper surface to disengage the latch assembly latches from the bracket assembly latch receivers, so that the plurality of tethers suspend the exploration vehicle from the landing vehicle deck.

* * * * *